Figure 1:
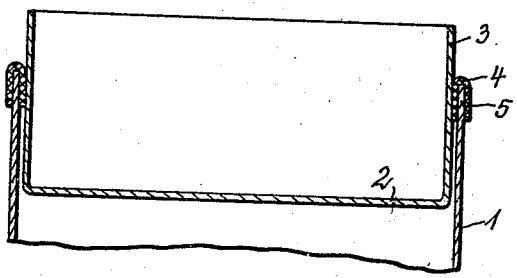

A. B. A. FICH.
METHOD FOR PRESERVING FOOD.
APPLICATION FILED JAN. 12, 1922.

1,420,373.

Patented June 20, 1922.

Inventor:
Alfred Berthold Andreas Fich
By
Attorney

UNITED STATES PATENT OFFICE.

ALFRED BERTHOLD ANDREAS FICH, OF COPENHAGEN, DENMARK.

METHOD FOR PRESERVING FOOD.

1,420,373.　　　Specification of Letters Patent.　Patented June 20, 1922.

Application filed January 12, 1922. Serial No. 528,773.

*To all whom it may concern:*

Be it known that I, ALFRED BERTHOLD ANDREAS FICH, captain, subject of the King of Denmark, residing at Islands Brygge 11, Copenhagen, Denmark, have invented certain new and useful Improvements in Methods for Preserving Foods, of which the following is a specification.

The present invention relates to a process of sterilizing food in cans having covers adapted to be seamed thereto; the invention having for its object to prevent the decomposition of the vitamines of the food during sterilization.

It has been previously proposed to sterilize canned food by subjecting the can and its contents to the action of heat before sealing, and then sealing the can hermetically while the same and its contents are still in a heated condition. In carrying out this known process, the cover is placed loosely on the can before heating, so that air and gas may escape through the loose joint between the cover and can. This loose connection between cover and can, however, prevents the latter from being removed from the autoclave and from being cooled before sealing, so that the sealing process must therefore take place in the autoclave, which is a drawback because it requires the combined use of heating and seaming apparatus of special construction, the use of ordinary seaming machinery not being possible. In order to avoid this drawback, it has been proposed to remove the can from the autoclave and to seam it on an ordinary seaming-machine and then, in the event of air having entered the can and thereby infected its contents, to heat the can and its contents to a high sterilizing temperature.

Now, this double heating has a fatal influence on the vitamines in the food; and it is altogether desirable to avoid long heating at a comparatively high temperature.

I have observed that in order to kill the aerobic bacteria in the food merely by heat action, temperatures ordinarily exceeding 110° C. will be requisite, whereas, if the air is removed from the can before sealing, then the spores of aerobic bacteria cannot germinate in the can. The spores of the anaerobic organisms in the food will be killed at a temperature lower than the temperature necessary to kill the spores of the aerobic organisms.

The object of the present invention is to secure a sterilizing-process according to which the sterilizing temperature may be kept relatively low (about 100°–110° C.), i. e., by removing air and gas from the can during the heating under such conditions that the can may be hermetically seamed on seaming machines of any kind without running the risk of air entering the can and infecting its contents when the can is removed from the autoclave for the final seaming. In sterilizing for a short time only at relatively lower temperatures (about 100°–110° C.) a more savoury and healthy preserved food is obtained than by means of other sterilizing processes, while the heat-and-oxygen-sensitive vitamines will only to a small degree be detrimentally affected by this treatment.

For this purpose, such cans only are used, of which the cover is designed to be connected to the can by seaming, and the cover is rigidly clenched to the can before sterilizing the food in carrying out the first stage of the seaming. Provided that a packing material, for instance rubber, is arranged in the fold between cover and can, air cannot possibly enter the can, when the same is removed from the heating chamber or autoclave before the final stage of the seaming is effected.

The drawing illustrates the process.

Figure 2:
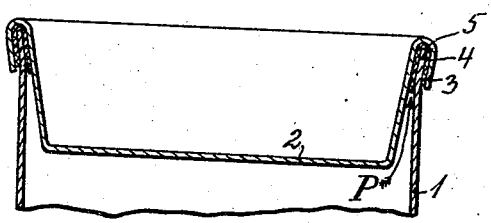
Figure 3:
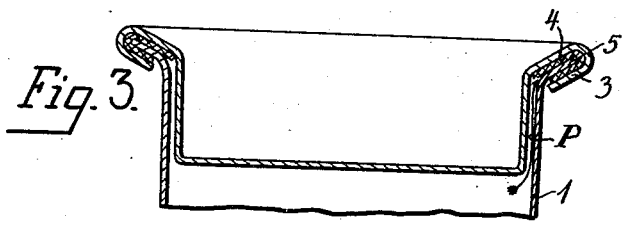
Figure 4:
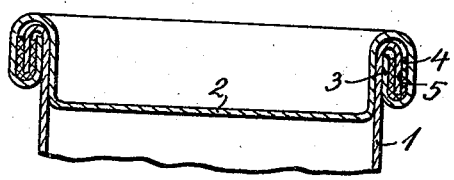

Fig. 1 shows a cross-section through the upper part of the can before the first folding of the cover takes place, Figs. 2 and 3 show cross-sections through the same after the first folding of the cover and Fig. 4 shows a cross-section through the same after the completion of the preservation process and the final closing of the can.

1 is the body and 2 the cover of a can adapted for processing of food of any kind. The cover and the body should be interconnected by folding, which is performed in the usual manner in two steps, first by turning the annular border 3 of the cover (Fig. 1) over the upper edge of the can body into the position shown in Fig. 2, and second by turning the fold—thus formed between the cover and body—over (Fig. 3) to the position shown in Fig. 4. 4 is a rubber-packing arranged around the upper edge of the can.

After the first folding of the cover and the body, i. e. when the connection between these members is as shown in Fig. 2 or in Fig. 3, the can, or a plurality of cans, is placed in an autoclave, wherein the can is submerged into water which is heated to the preservation temperature, or exposed to the influence of steam, which heats the box to the desired temperature, i. e., about 100°–110° C.

When heated the air and other gaseous components in the can will expand and force their way between the packing 4 and the upper border 5 of the body as shown by the arrow P in Fig. 2 and Fig. 3, thereby escaping from the can.

When all air and other gaseous components in the food have been driven out of the can in this manner, the can is removed from the autoclave and—while still hot—exposed to the second step of the bordering process, whereby the can is closed hermetically by forcing the fold between the cover and can into the position shown in Fig. 4.

If the pressure rising in the can during the processing should decrease for any reason before the final folding takes place, the water or steam in the autoclave or, when the can is removed from said autoclave, the air would, may-be, try to enter the can through the half-closed fold between cover and body. Provided that the said first folding step be carefully effected the packing 4, however, will prevent such an infection of the preserved food, as said packing, being firmly secured between the edge or border 5 of the body and the surrounding border 3 of the cover, Fig. 2, will be compressed by the influence of any outer pressure and make the connection shown in Figs. 2 and 3 airtight.

Having now particularly described and ascertained the nature of my said invention and in what manner the same is to be performed, I declare that what I claim is:—

1. A process of sterilizing foods in a can adapted to be seamed to its cover, consisting in depositing the food in the can, interposing a layer of packing material between the cover and the edge of the can, subjecting the can and cover to an initial seaming operation to clench the cover rigidly to the can, subjecting the can and its contents to the action of heat whereby the air and the gas generated in the can are caused to escape through the joint between the cover and can, and then hermetically sealing said joint.

2. A process of sterilizing foods in a can adapted to be seamed to its cover, consisting in depositing the food in the can, interposing a layer of packing material between the cover and the edge of the can, subjecting the can and cover to an initial seaming operation to rigidly clench the cover to the can, heating the can and its contents for a short time to a temperature of 100°–110° C. whereby the air and the gas generated in the can are caused to escape through the joint between the cover and can, and then hermetically sealing said joint.

In testimony whereof I affix my signature.

ALFRED BERTHOLD ANDREAS FICH.

Witnesses:
 CARL MEMMINGER,
 JULDUS SCHMANCE.